Sept. 8, 1942.　　　D. S. WEISS　　　2,295,021
TRAILER COUPLING
Filed Feb. 20, 1940　　　2 Sheets-Sheet 1
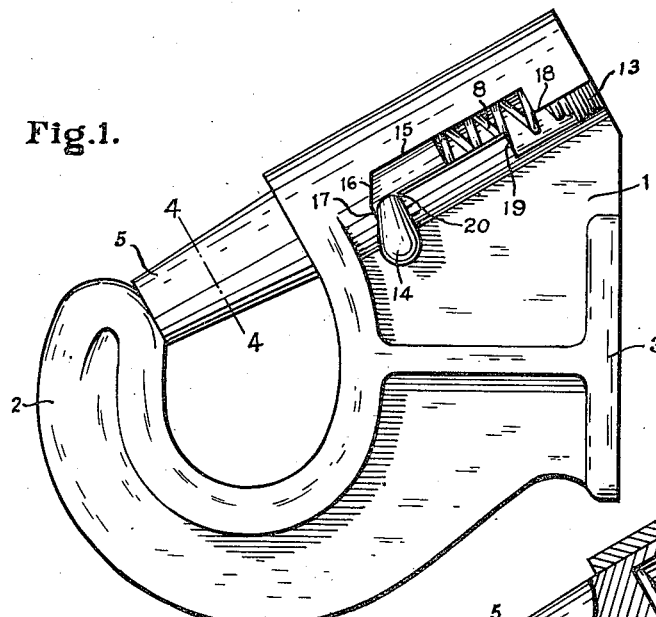
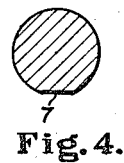
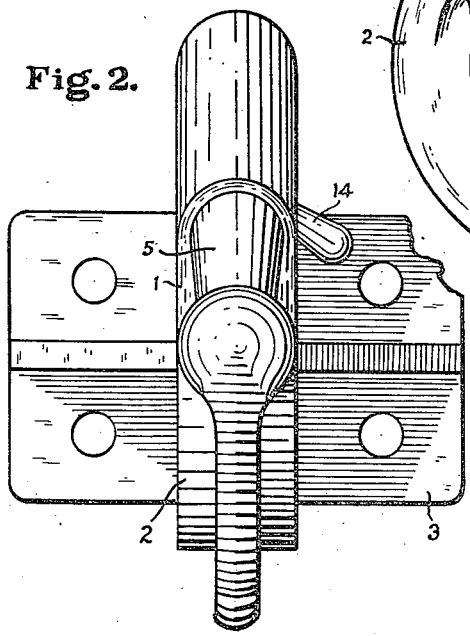
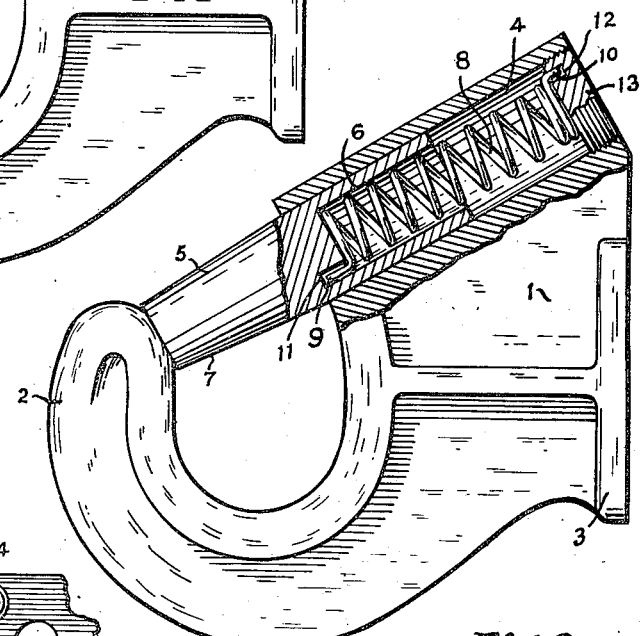
Inventor:
Dewey S. Weiss,
By Rudolph B. Prentice,
Attorney.

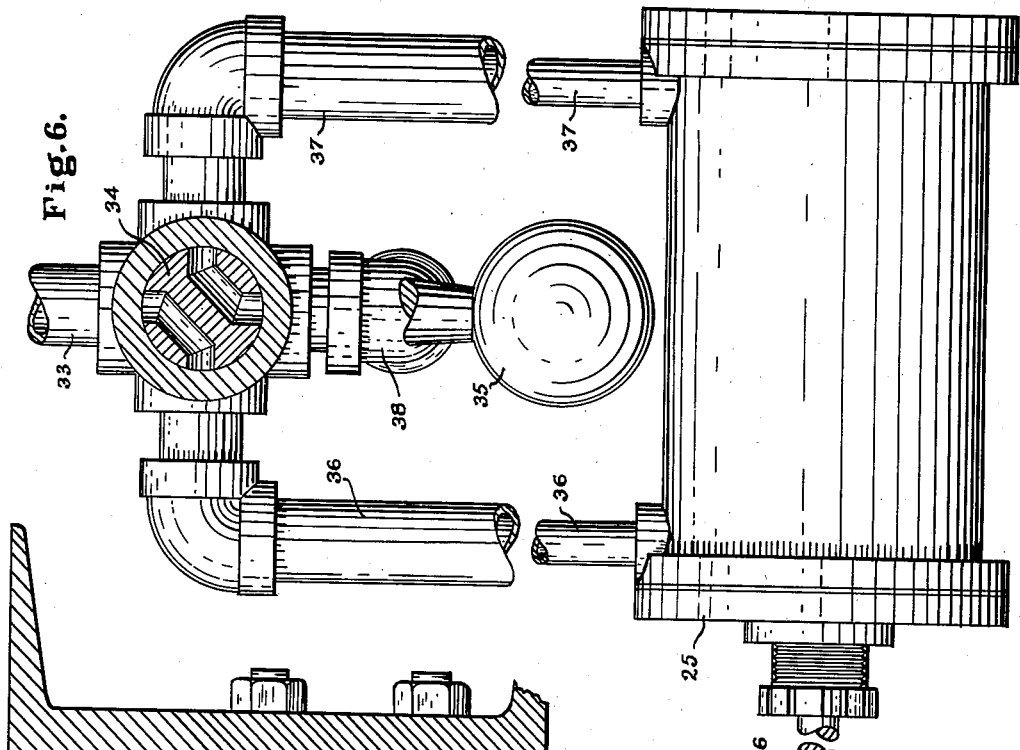
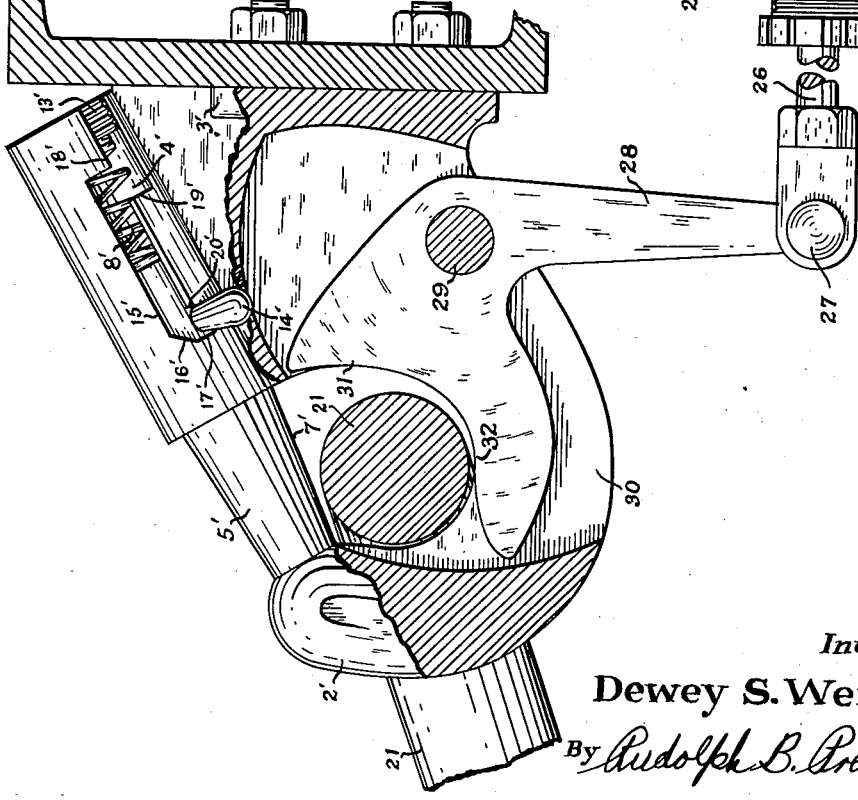

Patented Sept. 8, 1942

2,295,021

UNITED STATES PATENT OFFICE 2,295,021

TRAILER COUPLING

Dewey S. Weiss, Portland, Oreg.

Application February 20, 1940, Serial No. 319,887

1 Claim. (Cl. 280—33.15)

My invention relates to trailer couplings of the general type employing a rigid hook element in combination with means to close the same.

The principal object of my invention is the provision of a coupling of relatively low cost adapted for use on light equipment which contains the most improved safety features to prevent accidental uncoupling.

Other objects and advantages of my invention will be apparent in the following discourse wherein the significance of the reference characters in the accompanying drawings, details of construction and operation of a typical coupling embodying my invention, and the particular advantages thereof are explained.

Figure 1 represents a view of the side of the coupling shown in elevation.

Figure 2 represents a view of the rear of the coupling shown in elevation.

Figure 3 represents a view of the side of the coupling from which parts have been broken away to reveal the operating elements.

Figure 4 is a section taken on the line 4—4 of Figure 1.

Figure 5 represents a view of the side of the coupling as made in modified form to adapt the same to the application of power clamping and ejecting auxiliary means shown partially in elevation and fragmentary section.

Figure 6 represents a view of a control device for the auxiliary clamping and ejecting means shown in Figure 5, in fragmentary elevation and section.

A main body-member 1 is formed with a rigid hook 2, an attaching plate 3, and an inclined cylindrical chamber 4 in which the bolt 5, formed with the cylindrical recess 6 and the flat surface 7, is slidably fitted and urged to the closed position, at which the same is shown, by the helical spring 8 the ends of which are secured against tortional displacement by the engagement of suitably formed ends 9 and 10 with receptacles therefor 11 and 12 in the said bolt 5 and a plug 13, respectively, the latter being screwed into the cylindrical recess 4 to form as well a closure therefor.

A handle 14, rigidly secured upon the bolt 5, moves angularly and longitudinally through the slot 15 communicating with the cylindrical recess 4 and characterized by an incline 16, perpendicular extension 17 in which the handle is disposed as shown in Figure 1, and offset portion 18.

To open the hook the bolt 5 is withdrawn into the cylindrical recess 4 by manipulation of the handle 14, first, to rotate the bolt 5 upon its axis so that the shank of the handle 14 engages the incline 16 to impart a helical motion to the bolt to strain the spring 8 in tortion, and second to move the bolt 5 longitudinally to compress the spring 8. At the limit of upward travel of the handle 14 and bolt 5, the handle 14 and bolt 5 are rotated in the reverse direction to engage the shank of the handle 14 behind the shoulder 19 to lock the bolt in the opened position.

To close the hook, the handle 14 is rotated to dislodge it from its position behind the shoulder 19 when the spring 8 previously compressed and strained in tortion will actuate the bolt to its closed position as shown in Figure 1 whereat the handle 14 is securely locked behind the shoulder 20 against displacement by forces which may act to move the bolt to the opened position accidentally.

Now it is to be observed that the spring 8 serves both to actuate the bolt to the closed position with reference to longitudinal disposition thereof and as well as to position in rotation whereat the handle 14 will be securely lodged behind the shoulder 20.

Supplementing these effects is another effect provided for by the flat surface 7 formed upon the under side of the bolt 5 against which incidental upward movements of the trailer-tongue-eye, not shown, are restrained. The forces resulting from these upward impacts of the trailer-tongue-eye are resolved into forces tending to hold the handle 14 in the locked position or to move the same thereto if slightly out of place due to road vibrations or other causes.

Thus, three distinct provisions are made to close and keep closed the bolt 5 which may be enumerated as follows: first, the extension of the spring 8, the untwisting of the spring 8 to lock the handle behind the shoulder 14, and the forces resulting from impacts of the trailer-tongue-eye against the flat surface 7 to move the bolt 5 in rotation to the locked position or hold the same thereat.

It is to be further observed that still another valuable effect accrues out of the disposition of the bolt 5 and parts associated therewith, at an inclination from the horizontal or vertical attitudes. The aperture defined by the hook 2 and closed by the bolt 5 is accessible from the rear as well as from the top. If a trailer tongue-eye is in precisely the correct position it may be dropped into the open aperture which is receptive to the eye moving in an arcuate path about its pivotal attachment to the trailer at a lower level.

Should the trailer eye be presented to the coupling in a position whereat the same would rest upon the point of the hook 2, the tractor vehicle may be backed slightly to allow the eye to move into the aperture. If the backing movement is excessive, the parts of the coupling normal to the bolt and necessarily inclined, will deflect the eye downwardly into the aperture.

In applications of this type of coupling to heavier types of equipment it is desirable to provide some auxiliary means to perform the dual functions of holding the coupled trailer-tongue-eye as illustrated in Figure 5 at 21 against play back and forth resulting from inequalities in the roadway, which in the heavier equipment give rise to impacts of damaging force, and of ejecting the eye from the coupled engagement.

With slight modification this coupling may be adapted for use with pneumatically energized means to perform these auxiliary functions as illustrated in Figure 5. In this form a conventional double-acting pneumatic or hydraulic cylinder indicated at 25 actuates through its piston 26 and pivotal connection 27, a bell-crank member 28 pivotally mounted at 29 within the chamber 30 to compress the trailer-tongue-eye 21 against the hook member 2' to restrain the same against longitudinal oscillatory movement when the piston 26 is withdrawn into its cylinder 25, and to eject the trailer-tongue-eye 21 when the piston 26 is extended, by means of the respective movements of the features 31 and 32 of the bell-crank member 28 in alternate movements about its pivot 29.

The control of the cylinder 25 and hence its effects upon the member 28 is conveniently provided for by the valve device shown in Figure 6 with suitable pipe connections as shown. The fluid current, pneumatic or hydraulic, is conducted through the pipe 33 communicating with the rotary valve 34 operated by means of the weighted handle 35, and diverted through the pipe 36 in the setting shown, or through the pipe 37 in an alternate setting, as desired to actuate the piston 26 in the desired movement. The pipe 38 exhausts to atmosphere and communicates through the valve 34 with the end of the cylinder 25 opposite that end served by the pipe 33 accordingly as the valve 34 is set.

It will be observed that as shown in Figure 6 the weighted handle 35 is in the position whereat gravity would tend to retain it. In this position it is desirable that the bell-crank member 28 be strained to clamp the trailer-tongue-eye 21 as when the equipment is in use on the road. To uncouple, the bolt 5' is of course withdrawn by manual operation of the handle 14' and the weighted handle 35 is moved in counter-clockwise movement, if the energizing force is compressed air, to effect the ejection of the trailer-tongue-eye without manual effort.

Obviously, the control apparatus as illustrated in Figure 6, or its equivalent, may be conveniently located upon the tractor vehicle to afford such safety and labor saving factors as are indicated in the various uses of the equipment.

I am aware that prior to this invention couplings have been used employing a combination of gravity and spring actuated locking devices and that fluid pressure means acting through cylinders or diaphragm devices have been employed as clamping and ejecting elements. I therefore do not claim the combination of these elements broadly, but only that embodiment thereof equivalent to this disclosure.

I claim:

A trailer coupling comprising, a body-member formed with an attaching plate, an upwardly terminating hook defining an upwardly and rearwardly unrestricted aperture, and an inclined cylindrical slide-way axially aligned with the end of said hook formed with a longitudinal laterally disposed slot having terminal notches, a bolt slidable and rotatable in said slide-way adapted to close said aperture formed with a downwardly disposed flat surface and fitted with a handle to traverse said slot, and spring means to urge said bolt to the extended position and rotate the same to effect the engagement of said handle in one of said notches to lock the bolt in the closed position, wherein said flat surface of said bolt, said bolt-handle, and the lowermost of said notches are in such relationship as to hold the bolt locked in the extended and closed position when the trailer eye engages the flat surface.

DEWEY S. WEISS.